United States Patent [19]

Kathrein et al.

[11] Patent Number: 4,933,014
[45] Date of Patent: Jun. 12, 1990

[54] MAGNETIC IRON OXIDE PIGMENTS AND A PROCESS FOR THEIR PREPARATION

[75] Inventors: Hendrik Kathrein, Jüchen-Aldenhoven; Peter Kiemle, Krefeld-Traar; Fritz Rodi, Moers; Aloys Eiling, Bochum, all of Fed. Rep. of Germany

[73] Assignee: Bayer Aktiengesellschaft, Leverkusen-Bayerwerk, Fed. Rep. of Germany

[21] Appl. No.: 90,929

[22] Filed: Aug. 31, 1987

[30] Foreign Application Priority Data

Sep. 13, 1986 [DE] Fed. Rep. of Germany ....... 3631194

[51] Int. Cl.$^5$ .................................................. C09C 1/22
[52] U.S. Cl. ...................................... 106/459; 106/480; 428/403
[58] Field of Search ............... 106/304, 309, 459, 480; 427/129, 130; 428/403

[56] References Cited

U.S. PATENT DOCUMENTS

| | | |
|---|---|---|
| 3,931,025 | 8/1974 | Woditsch et al. |
| 4,200,680 | 6/1975 | Sasazawa et al. ............ 428/403 |
| 4,267,207 | 5/1979 | Sasazawa et al. ............ 427/129 |
| 4,297,395 | 1/1980 | Buxbaum et al. ............ 427/127 |
| 4,371,567 | 2/1983 | Chamard et al. ............ 427/130 |
| 4,414,245 | 6/1982 | Timberlake et al. .......... 427/127 |
| 4,594,267 | 6/1986 | Honma et al. ............... 427/127 |

FOREIGN PATENT DOCUMENTS

| | | |
|---|---|---|
| 988704 | 5/1976 | Canada . |
| 2235383 | 2/1973 | Fed. Rep. of Germany . |
| 2526363 | 2/1976 | Fed. Rep. of Germany . |
| 2347486 | 4/1977 | Fed. Rep. of Germany . |
| 2811473 | 9/1978 | Fed. Rep. of Germany . |
| 2829344 | 1/1979 | Fed. Rep. of Germany . |
| 2903593 | 8/1980 | Fed. Rep. of Germany . |
| 3038989 | 4/1981 | Fed. Rep. of Germany . |
| 3228021 | 2/1983 | Fed. Rep. of Germany . |
| 3344299 | 6/1984 | Fed. Rep. of Germany . |
| 209353 | 4/1984 | Netherlands . |
| 2001942 | 2/1979 | United Kingdom . |
| 2060592 | 5/1981 | United Kingdom . |
| 2131783 | 6/1984 | United Kingdom . |

Primary Examiner—Amelia Burgess Yarbrough
Attorney, Agent, or Firm—Connolly and Hutz

[57] ABSTRACT

Magnetic iron oxide pigments useful in magnetic signal recordings having a dependence of coercivity on temperature in the temperature range of from 76K to 298K of less than 0.13 kA/mK and having a coercivity on powder compressed to 0.9 g/cm$^3$ of greater than 51 kA/m are prepared by coating a magnetic iron oxide core material having the composition FeO$_x$ where x is a number from 1.33 to 1.5 in a first step with a compound containing divalent and trivalent iron having a ratio of Fe(III): Fe(II) from 0.01 to less than 2, and then in a second step coating the pre-coated core with a second coating of a cobalt compound.

6 Claims, 1 Drawing Sheet

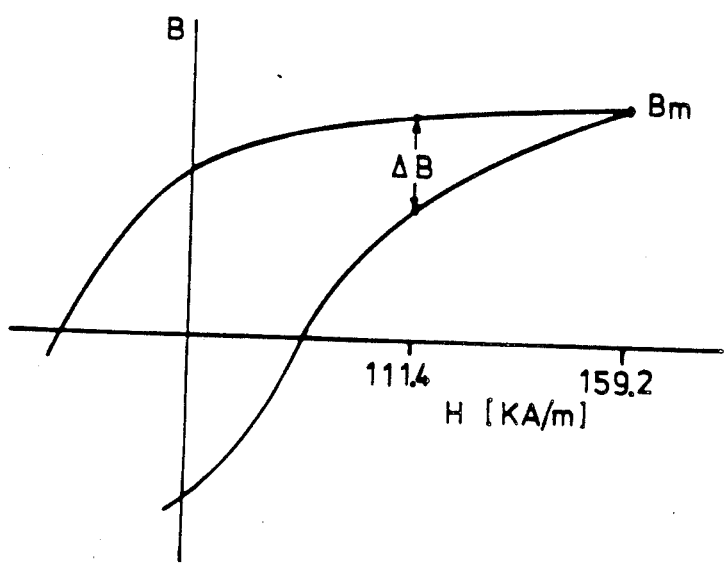

MAGNETIC IRON OXIDE PIGMENTS AND A PROCESS FOR THEIR PREPARATION

This invention relates to magnetic iron oxide pigments with a coating of cobalt compounds and to a process for the preparation of these iron oxide pigments.

BACKGROUND OF THE INVENTION $\gamma$-$Fe_2O_3$ magnetic pigments have coercivity values of up to about 31 kA/m and ferrite magnetic pigments have coercivity values of up to about 35 kA/m. Magnetic pigments having substantially higher coercive field strengths are increasingly required for magnetic signal recording in audio, video and data storage systems to increase the storage density. Various processes are known for increasing the coercive field strength of magnetic iron oxides.

According to German 2,903,593, pigments with higher coercivity values are obtained from $\alpha$-FeOOH precursor compounds which are doped with cobalt. A coercive field strength of about 50 kA/m is obtained with 1% cobalt and and FeO content of 20%. The disadvantage of these pigments, however, lies in their lower printing attenuation, their insufficient magnetic stability and the high temperature dependence of the coercivity.

Another method of obtaining high coercive field strengths has been described in German 2,235,383, in which a layer of cobalt ferrite is left to crystallize epitactically on a core of magnetic iron oxide in a strongly alkaline medium. These pigments have better values for printing attenuation and magnetic stability than the cobalt-doped pigments but are not entirely satisfactory in their control panel distribution, the dependence of their coercivity on the temperature, and the ratio of erasure in tapes. Pigments with more satisfactory properties can be obtained by applying several layers of compounds containing cobalt and/or iron to the core, as described in German 3,520,210.

In German 3,344,299 there is described a process for the preparation of a magnetic iron oxide powder containing cobalt, in which the iron oxide starting material is first coated with an iron-(II) compound and then with a cobalt compound. The magnetic properties are thereby improved.

It is an object of the present invention to provide magnetic iron oxide pigments with higher coercive field strength values which do not have the disadvantages described above of the magnetic iron oxide pigments of the prior art.

BRIEF DESCRIPTION OF THE INVENTION

It has now surprisingly been found that the control panel distribution, the proportion of high coercivity components and the temperature stability of the coercivity can be further improved in such magnetic iron oxide pigments coated with cobalt compounds by applying a compound of divalent and trivalent iron to the iron oxide pigments before they are coated with cobalt.

These magnetic iron oxide pigments coated with cobalt compounds are a subject matter of the present invention.

DETAILED DESCRIPTION OF THE INVENTION

These pigments are characterised in that the temperature dependence of their coercivity in the temperature interval of 76 K. to 298 K. is less than 0.13 kA/mK and the coercivity of powder compressed to 0.9 g/cm$^3$ is greater than 51 kA/m.

The cobalt content is preferably from 2.5 to 6% by weight, based on the coated magnetic iron oxide.

The present invention also relates to a process for the preparation of the pigments according to the invention. In this process, a core of magnetic iron oxide having the composition $FeO_x$, where x is from 1.33 to 1.5, is first coated with a compound containing divalent and trivalent iron in which the ratio of Fe(III) to Fe(II) is in the range of from 0.01 to less than 2, and a coating of cobalt compound is then applied in a second step of the process.

The material used as magnetic iron oxide core according to the invention may be $\gamma$-$Fe_2O_3$ or $Fe_2O_4$ pigments or berthollide compounds having an FeO content of from 0 to 30%. These iron oxide may contain one or more accompanying elements from the group comprising P, Zn, B, Si, Sn, Ge, Al, Mn, Cr and Ni.

The iron (II)-(III) compound may be applied to the material of the core by any of several variations of the process.

Particularly preferred is the variation in which the Fe(III):Fe(II) ratio is adjusted by the iron salt used in the process.

For this purpose, the iron oxide used as core is dispersed in water and to it is added an iron salt containing from 1 to 20% of Fe(III) (based on the total iron content), preferably from 2 to 10% Fe(III) or a solution thereof and a solution of an alkali. The alkali solution may be added before or after dispersion of the core and before or after the addition of iron salt solution.

In another preferred embodiment of the process according to the invention, the Fe(III):Fe(II) ratio is adjusted by controlled oxidation of the Fe(II) before the addition of cobalt.

For this purpose, the iron oxide core is dispersed in water and an iron salt containing iron(II) or a solution of this salt and a solution of alkali are added. The alkali solution may be added before or after dispersion of the core and before or after the addition of iron salt solution.

A further portion of Fe(II) is then oxidized to Fe(III) by the introduction of air (or other gas mixtures containing oxygen) or by the addition of oxidizing agents. Oxidation of the suspension may be carried out at temperatures from 20° C. to the boiling point.

Application of the iron compound is followed by application of the cobalt compound by the addition of a cobalt salt to the pigment suspension. The coating of cobalt may be applied under oxidizing or inert conditions.

The OH concentration during the process of coating with iron and with cobalt is in the range of 0.1 to 10 Mol/l, preferably 0.3 to 5 Mol/l.

The solids content on the core material in the suspension is from 30 to 200 g/l, preferably from 50 to 150 g/l. The quantity of iron oxide applied amounts to 1 to 25% of the core material put into the process.

The pigment suspension is worked up by filtration, washing and drying.

The invention will now be explained with the aid of examples which do not, however, limit the invention.

To determine the properties of the iron oxide pigments according to the invention in the tape, about 200 g of the magnetic iron oxide pigment are introduced into a lacquer based on polyurethane so that the proportion by volume of iron oxide pigment is about 45%. The dispersion is ground in a bead mill for 3 hours and then applied as a thin layer to a film of polyester by means of a coating machine. The dispersion is then orientated in a homogeneous magnetic field of 80 KA/m and hardened at 100° C. The following parameters are determined after the tape has been cut into segments suitable for testing:

$I^Hc$: coercivity determined at 398 kA/m.

Br/Bs: remanent magnetization/saturation magnetization.

SFD: control panel distribution.

BRIEF DESCRIPTION OF THE DRAWING

The FIGURE illustrates a hysteresis curve for the iron oxide pigment of this invention.

EXAMPLE 1

480 g of the magnetic ferrite pigment Bayferrox® AC 5111M (trade product of Bayer AG, average particle length 0.35 μm, specific surface area 24 m²/g, coercivity 33.8 kA/m) are dispersed in 1920 ml of water by means of a Kotthoff mixing siren and then ground up in a corundum disc mill and transferred to a reaction vessel equipped with a stirrer. 600 ml of water, a solution of 152.9 g of $FeSO_4.7H_2O$ and 4.0 g of $Fe_2(SO_4)_3$ in 600 ml of water and 553 ml of NaOH solution (740 g NaOH/l) are then added. The Fe(III) content of the $FeSO_4$ solution amounts to 3.5% of the total iron content of the solution. A solution of 80 g of $CoSO_4.7H_2O$ in 300 ml of water is added after 5 minutes. The suspension is heated to 80° C. and then gassed with air for a further 3 hours.

The suspension is worked up by filtration, washing and drying in a circulating air drying cupboard at 30° C.

EXAMPLE 2

480 g of the magnetic ferrite pigment, Bayferrox® AC 5111M (trade product of Bayer AG, average particle length 0.35 μm, specific surface area 24 m²/g, coercivity 33.8 kA/m) are dispersed in 1920 ml of water by means of a Kotthoff mixing siren and then ground up on a corundum disc mill and transferred to a reaction vessel equipped with a stirrer. 600 ml of water, a solution of 150.5 g of $FeSO_4.7H_2O$ and 5.7 g of $Fe_2(SO_4)_3$ in 600 ml of water and 553 ml of NaOH solution (740 g NaOH/l) are then added. The Fe(III) content of the $FeSO_4$ solution amounts to 5% of the total iron content of the solution. A solution of 80 g of $CoSO_4.7H_2O$ in 300 ml of water is added after 5 minutes. The suspension is heated to 80° C. and gassed with air for a further 3 hours.

The suspension is worked up by filtration, washing and drying in a circulating air drying cupboard at 30° C.

EXAMPLE 3

480 g of the magnetic ferrite pigment Bayferrox® AC 5111M (trade product of Bayer AG, average particle length 0.35 μm, specific surface area 24 m²/g, coercivity 33.8 kA/m) are dispersed in 1920 ml of water by means of a Kotthoff mixing siren and then ground down in a corundum disc mill and transferred to a reaction vessel equipped with a stirrer. 1 liter of water, a solution of 158.4 g of $FeSO_4.7H_2O$ in 600 ml of water and 553 ml of NaOH solution (740 g NaOH/l) are then added. The suspension is heated to 80° C. and then gassed with air at the rate of 20 l/h for 20 minutes. After the addition of a solution of 80 g of $CoSO_4.7H_2O$ in 300 ml of water, the suspension is gassed with air at the rate of 20 l/h for 3 hours. The suspension is then heated to 80° C. and gassed with air for a further 3 hours.

The suspension is worked up by filtration, washing and drying in a circulating air drying cupboard at 30° C.

EXAMPLE 4

480 g of the magnetic γ-$Fe_2O_3$ pigment Bayferrox® AC 5108M (trade product of Bayer AG, average particle length 0.3 μm, specific surface area 30 m²/g, coercivity 31 kA/m) are dispersed in 1920 ml of water with the aid of a Kotthoff mixing siren and then ground up in a corundum disc mill and transferred to a reaction vessel equipped with a stirrer. 600 ml of water, a solution of 175.6 g of $FeSO_4.7H_2O$ and 3.9 g of $Fe_2(SO_4)_3$ in 600 ml of water and 632 ml of NaOH solution (740 g NaOH/l) are then added. The Fe(III) content of the $FeSO_4$ solution amounts to 3% of the total iron content of the solution. A solution of 91.4 g of $CoSO_4.7H_2O$ in 300 ml of water is added after 5 minutes. The suspension is then heated to 80° C. and gassed with air for a further 3 hours.

The suspension is worked up by filtration, washing and drying in a circulating air drying cupboard at 30° C.

COMPARISON EXAMPLE 1

480 g of the magnetic ferrite pigment Bayferrox® AC 5111M (trade product of Bayer AG, average particle length 0.35 μm, specific surface area 24 m²/g, coercivity 33.8 kA/m) are dispersed in 1920 ml of water with the aid of a Kotthoff mixing siren and then ground up in a corundum disc mill and transferred to a reaction vessel equipped with a stirrer. 600 ml of water, a solution of 158.4 g of $FeSO_4.7H_2O$ in 600 ml of water and 553 ml of NaOH solution (740 Pg NaOH/l) are then added. The Fe(III) content of the $FeSO_4$ solution amounts to less than 0.1% of the total iron content of the solution. A solution of 80 g of $CoSO_4.7H_2O$ in 300 ml of water is added after 5 minutes. The suspension is heated to 80° C. and then gassed with air for a further 3 hours.

The suspension is worked up by filtration, washing and drying in a circulating air drying cupboard at 30° C.

COMPARISON EXAMPLE 2

480 g of the magnetic ferrite pigment Bayferrox® AC 5111M (trade product of Bayer AG, average particle length 0.35 μm, specific surface area 24 m²/g, coercivity 33.8 kA/m) are dispersed in 1920 ml of water by means of a Kotthoff mixing siren and then ground up in a corundum disc mill and transferred to a reaction vessel equipped with a stirrer. 600 ml of water, a solution of 144.9 g of $FeSO_4.7H_2O$ in 300 ml of water, a solution of 73.1 g of $CoSO_4.7H_2O$ in 600 ml of water and 506 ml of NaOH solution (740 g NaOH/l) are then added. The suspension is heated to 80° C. and then gassed with air for a further 3 hours.

The ratio ΔB/Bm is a measure of the proportion of constituents which have high coercivity values. The method of calculating the ΔB/Bm value from the hysteresis curve is illustrated in the FIGURE.

TABLE 1

| Example | Type of core | BET* m²/g | Fe(III) | Powder Br/ρ mWb·m/kg | $I^{HC}$ | Bm/ρ mWb·m/kg | $I^{HC}$ kA/m | Tape Br/Bs | SFD | ΔB/Bm | Temperature dependence of the $I^{HC}$ in the range from 76 to 298 K (kA/m·K) |
|---|---|---|---|---|---|---|---|---|---|---|---|
| 1 | Ferrite | 28 | 3.5% | 50.5 | 55.7 | 93.1 | 60.8 | 0.82 | 0.49 | 0.035 | 0.10 |
| 2 | Ferrite | 28 | 5% | 52.7 | 55.7 | 96.9 | 61.4 | 0.89 | 0.42 | 0.020 | 0.10 |
| 3 | Ferrite | 28 | oxidation by air | 52.3 | 55.2 | 98.0 | 58.4 | 0.83 | 0.45 | 0.032 | 0.10 |
| V1 | Ferrite | 28 | 0% | 52.0 | 58.3 | 98.1 | 60.4 | 0.86 | 0.51 | 0.055 | 0.14 |
| V2 | Ferrite | 28 | 0% | 51.6 | 57.0 | 98.0 | 58.2 | 0.86 | 0.55 | 0.065 | 0.18 |

*Specific surface area (BET determined by the $N_2$ one point method)

What is claimed is:

1. Magnetic iron oxide pigments having a coating of cobalt compounds having a dependence of coercivity on temperature in the temperature range of from 76 K. to 298 K. of less than 0.13 kA/mK and having a coercivity on powder compressed to 0.9 g/cm³ of greater than 51 kA/m.

2. Magentic iron oxides according to claim 1 wherein the cobalt content is from 2.5 to 6% by weight, based on the coated magnetic iron oxide pigment.

3. Magnetic iron oxide pigments accordiing to claim 1 which comprises:
   (i) a core of $FeO_x$ wherein x is a number from 1.33 to 1.5,
   (ii) a first coating on the core by compounds containing divalent and trivalent iron with a ratio of Fe(III) to Fe(II) from 0.01 to less than 2, and
   (iii) a coating of a cobalt compound over the first coating.

4. Process for the preparation of magnetic iron oxide pigments coated with cobalt according to claim 1 which comprises coating a magnetic iron oxide core material having the composition $FeO_x$ where x is a number from 1.33 to 1.5 in a first step with a compound containing divalent and trivalent iron having a ratio of Fe(III):Fe(II) from 0.01 to less than 2, and then in a second step coating the pre-coated core with a second coating of a cobalt compound.

5. Process according to claim 4 wherein the Fe(III):Fe(II) ratio is adjusted by the amount of Fe(III) and Fe(II) iron salts mixed together.

6. Process according to claim 4 wherein the Fe(III):Fe(II) ratio is adjusted by controlled oxidation of Fe(II) prior to the second step cobalt coating.

* * * * *